United States Patent
James et al.

[11] Patent Number: 5,774,823
[45] Date of Patent: Jun. 30, 1998

[54] METHOD OF GENERATION CORRECTION TABLES FOR MISFIRE DETECTION USING NEURAL NETWORKS

[75] Inventors: John Victor James, Walled Lake; Timothy Mark Feldkamp; Kenneth Andrew Marko, both of Ann Arbor; Lee Albert Feldkamp, Plymouth; Gintaras Vincent Puskorius, Novi, all of Mich.

[73] Assignee: Ford Global Technologies, Inc., Dearborn, Mich.

[21] Appl. No.: 923,670

[22] Filed: Sep. 4, 1997

[51] Int. Cl.⁶ .................................................. G01M 15/00
[52] U.S. Cl. .......................... 701/110; 73/116; 73/117.3; 123/414; 123/436
[58] Field of Search ................................. 73/116, 117.2, 73/117.3, 118.1; 123/419, 425, 436; 701/101, 110, 111

[56] References Cited

U.S. PATENT DOCUMENTS

| | | | |
|---|---|---|---|
| 5,044,194 | 9/1991 | James et al. | 73/117.3 |
| 5,109,695 | 5/1992 | James et al. | 73/117.3 |
| 5,117,681 | 6/1992 | Dosdall et al. | 73/116 |
| 5,193,513 | 3/1993 | Marko et al. | 73/117.3 |
| 5,377,537 | 1/1995 | James | 73/117.3 |
| 5,495,415 | 2/1996 | Ribbens et al. | 73/117.2 |
| 5,691,469 | 11/1997 | Mezger et al. | 73/117.3 |
| 5,699,253 | 12/1997 | Puskorius et al. | 73/117.3 |

OTHER PUBLICATIONS

"Neurocontrol of Nonlinear Dynamical Systems with Kalman Filter–Trained Recurrent Networks", G.V. Puskorius et al., IEEE Transactions on Neural Networks, vol. 5 (1994), pp. 279–297.

*Primary Examiner*—George M. Dombroske
*Attorney, Agent, or Firm*—Mark L. Mollon; Roger L. May

[57] ABSTRACT

A method of automating the calibration of lookup tables containing correction values to be used in an on-board vehicle system is disclosed. The method includes training a neural network to model engine behavior by outputting cylinder specific crankshaft acceleration correction values in response to any engine speed and load input conditions. The correction values generated are stored in a memory device. The training takes place off-board the vehicle, using a data set previously obtained from operating a representative engine under normal operating conditions.

16 Claims, 5 Drawing Sheets

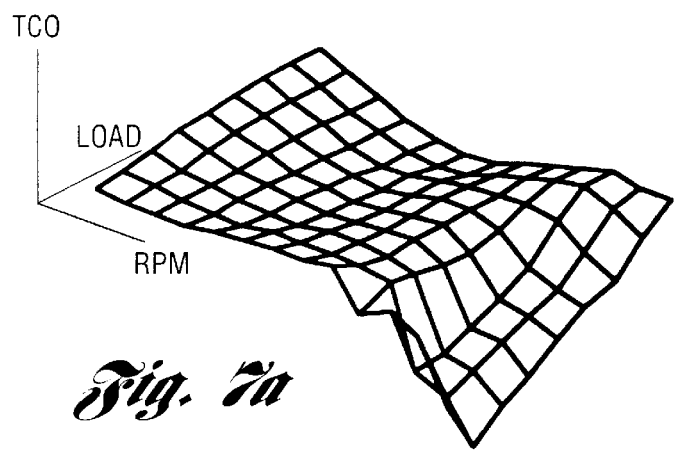
Fig. 7a
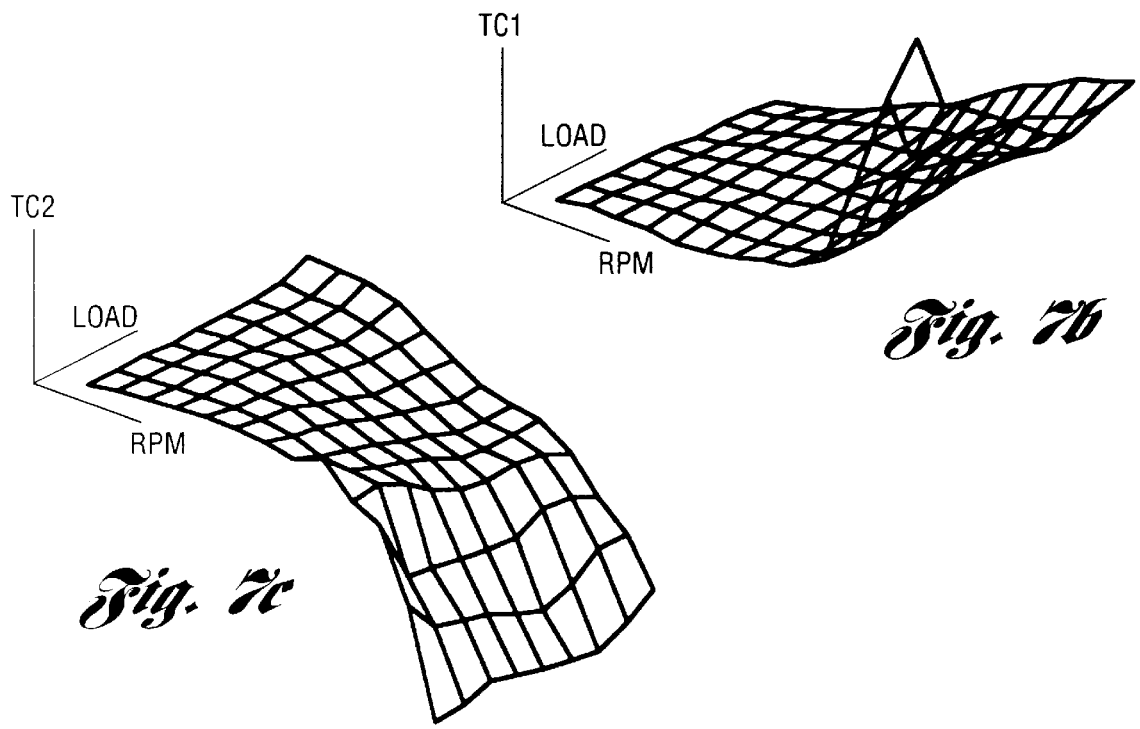
Fig. 7b
Fig. 7c
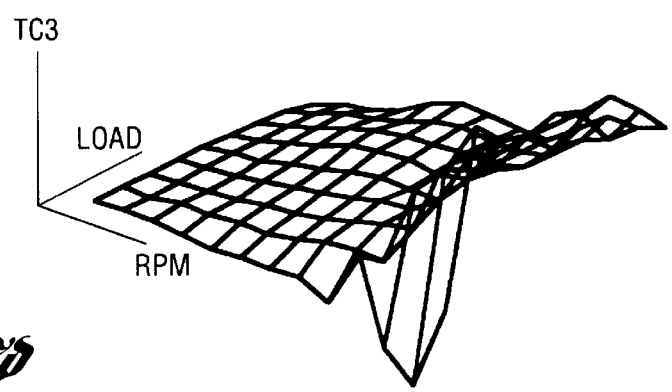
Fig. 7d

METHOD OF GENERATION CORRECTION TABLES FOR MISFIRE DETECTION USING NEURAL NETWORKS

TECHNICAL FIELD

This invention relates generally to misfire detection in internal combustion engines and, more particularly, to a method of generating cylinder specific torsional correction values to be used in an on-board engine misfire detection system to correct systematic irregularities in measured engine acceleration caused by torsional flexing of the crankshaft during rotation to thereby provide a more accurate discrimination between misfire and normal firing of the engine.

BACKGROUND ART

One way to detect misfires in internal combustion engines is to measure crankshaft speed and observe fluctuations in speed. Detection of deviations in crankshaft velocities (as manifested by abnormal acceleration values) from expected normal crankshaft velocities is an indication of misfire. Deviations in acceleration are determined over nominally equal successive intervals of crankshaft rotation, referred to as Profile-Ignition-Pick-Up intervals (PIP intervals). A PIP signal is a digital signal received from a sensor, that detects specified positions of rotation of a crankshaft mounted wheel during engine rotation. PIP intervals are also known as combustion intervals, which are equal in length (but not necessarily phase) to the angular rotation between top dead centers of adjacent cylinders in the firing order.

Ideally, during normal operation, an engine will produce a series of PIP transition signals with periods that indicate the average crankshaft velocity during a substantial portion of the power stroke for each of the cylinders in the engine. The crankshaft velocity will either remain constant (zero acceleration), increase (positive acceleration) or decrease (negative acceleration) depending on whether the engine is operating at steady state, accelerating or decelerating, respectively. For example, if a normal engine is operating under steady-state operation (no acceleration), then it is expected to produce an acceleration value of near zero over successive PIP intervals. However, if a particular cylinder in an engine produces a sufficiently negative acceleration value during steady-state operation, then this occurrence will be interpreted as a misfire condition, since a zero value is expected as an output for all cylinders in a normal engine during steady state operation.

Accordingly, misfire detectors in general look for individual cylinders yielding acceleration values different from the local norm of all cylinders, where the local norm depends upon the operating condition (i.e., steady state, acceleration, or deceleration, etc.). The problem is that individual cylinders in normal engines tend to yield values of acceleration, which differ slightly from the local norm of all cylinders in a systematic manner according to cylinder number. In a normally operating engine, this will interfere with the misfire detection system's ability to detect abnormal behavior due to misfire.

There are at least two sources of such cylinder-specific irregularities. The first is discussed in Dosdall et al. 5,117,681, assigned to present assignee, and deals with systematic irregularity arising from PIP spacing of the wheel. If the wheel which serves as the position encoder on the crankshaft is even slightly irregular in PIP-interval spacing (e.g., a few tenths of a degree difference), then a normal engine operating at constant true PIP-to-PIP velocity (steady state) will appear to be experiencing subtle velocity changes (hence, non-zero acceleration values). The velocity changes will appear to coincide with the particular cylinders associated with the irregular PIP intervals. Although the degree of impact that a given wheel error has on the acceleration calculation is strongly rpm-dependent, the error itself is fixed, and so it can be empirically determined at any operating condition, even deceleration.

The second problem is that even under normal operating conditions, the crankshaft will produce different amounts of speed-up and slow-down because of the non-rigid (torsional) behavior of the crankshaft. Since the crankshaft is not rigid, it produces subtle oscillations (due to crankshaft flexing) in the PIP signal (systematic noise). This noise tends to camouflage true misfires and can cause an erroneous indication of one or more cylinders as having misfired even when engine operation is in fact normal. For example, cylinders at the front of a crankshaft might affect the speed of the crankshaft at the measuring point slightly differently than cylinders at the rear. The effects of crankshaft-torsional flexing can occur when the power is cut off (as in the Dosdall et al. patent), because inertial torques produce uneven motions (acceleration). In general, the effects of such torsional variations on the calculated acceleration values are most pronounced at higher engine speeds as manifested in typical engine data.

Proposals to reduce these torsional effects include hardware changes and/or algorithm modifications. Hardware changes (such as relocating the encoder wheel and sensor to the rear of the engine) have the greatest beneficial impact, but are considered more invasive and costly than algorithmic improvements. The goal of algorithmic torsional compensation is to reduce or eliminate the small variations in the acceleration parameter attributable to flexing of the crankshaft, while retaining the signal due to loss of combustion power (misfire). One approach to torsional compensation is to modify each measured acceleration value in such a way as to eliminate differences among cylinders for normal engine operation. For instance, a set of cylinderspecific correction values can be subtracted from the raw crankshaft acceleration (ACCEL) values, which yields the improvements seen in some high-speed data. This is illustrated in FIGS. 1 and 2 which plot the deviant acceleration values (DACCEL) versus cylinder number (listed in firing order, denoted SEQ) for many engine cycles under nearly steady-state conditions. DACCEL is ACCEL minus a running median average. It can be seen in the first plot that the misfires (spread among all cylinders) consistently lie below the normals, but follow a similar pattern with respect to cylinder firing sequence. Thus, if all data are adjusted so that the normals have similar means regardless of cylinder number (FIG. 2), the misfire points also line up nearly straight.

While this agreement in the pattern of normals and misfires across the cylinders is rarely exact (nor is it expected to be, based on the nonlinear characteristics of the engine dynamics), the two patterns are usually sufficiently similar to yield substantial signal improvement by this method.

One issue associated with this approach is that of determining the appropriate cylinder-specific correction values, which vary with engine speed and load. One method is to determined correction factors during development, and storing them as calibration values for later recall. See, for example, James U.S. Pat. No. 5,377,537, assigned to the assignee of the present invention. However, each of these factors is a function of speed and load, which must be represented on-board as a lookup table, polynomial, or in some other form. Tables are simple to interpolate, but require much space in ROM (read only memory); closed-form functional representations require fewer parameters but more time to compute. In the present invention, tables are utilized, though other forms of functional representation may easily be substituted.

It is well known that neural networks are very capable of learning representations of complex functions in multidimensional space. A network which produces an output vector based only on the current input vector is known as a feedforward neural network (or static neural network—SNN). This SNN differs from the more complex recurrent neural network (RNN) which has internal feedback between layers, creating "memory" of recent past input vectors which affects the transformation of the current input vector.

SUMMARY OF THE INVENTION

In accordance with the present invention speed/load dependent torsional correction can be applied over the full range of engine operation and the procedure for calibrating the lookup tables used in this correction is greatly simplified by the use of a neural network trained off-line. The use of this network does not involve any real-time or on-board execution. It is simply a highly efficient way of calibrating the torsional correction algorithm.

Calibration of complex tables is facilitated in the present invention by training a feedforward neural network to estimate the effect of crankshaft torsional oscillations on the measured angular acceleration under normal engine operation. Because small deviations in acceleration caused by engine misfire can be obscured by these oscillations under some conditions, characterizing the latter as functions of speed and load allows for their correction in signal processing for misfire detection.

Training a neural network off-line to emulate the torsional characteristics of normal engine signals provides at least two advantages:

1) The network can be trained with any data set which reasonably covers the operating region of the engine, gathered on the road under steady-state as well as transient conditions. This eliminates the need to precisely control engine operation to a predefined set of points on a dynamometer.

2) After the network has been trained and tested on a body of data, it can be used to easily generate a set of cylinder-specific correction tables (one speed/load table per cylinder) for inclusion in on-board strategy. If subsequent testing indicates the need for more dense (or less dense, to conserve space) tables, these can be regenerated from the same neural network without any additional data.

This method does not require on-board implementation of a neural network, as do more sophisticated (and inherently more powerful) methods of torsional mitigation for misfire detection. Also, this approach may easily be applied to automate calibration of other engine control and diagnostic parameters as well.

BRIEF DESCRIPTION OF THE DRAWINGS

A more complete understanding of the present invention may be had from the following detailed description which should be read in conjunction with the drawings in which:

FIGS. 7a–7d show plots of cylinder specific torsional correction tables as functions of speed and load.

DETAILED DESCRIPTION OF PREFERRED EMBODIMENT

Figure 1:
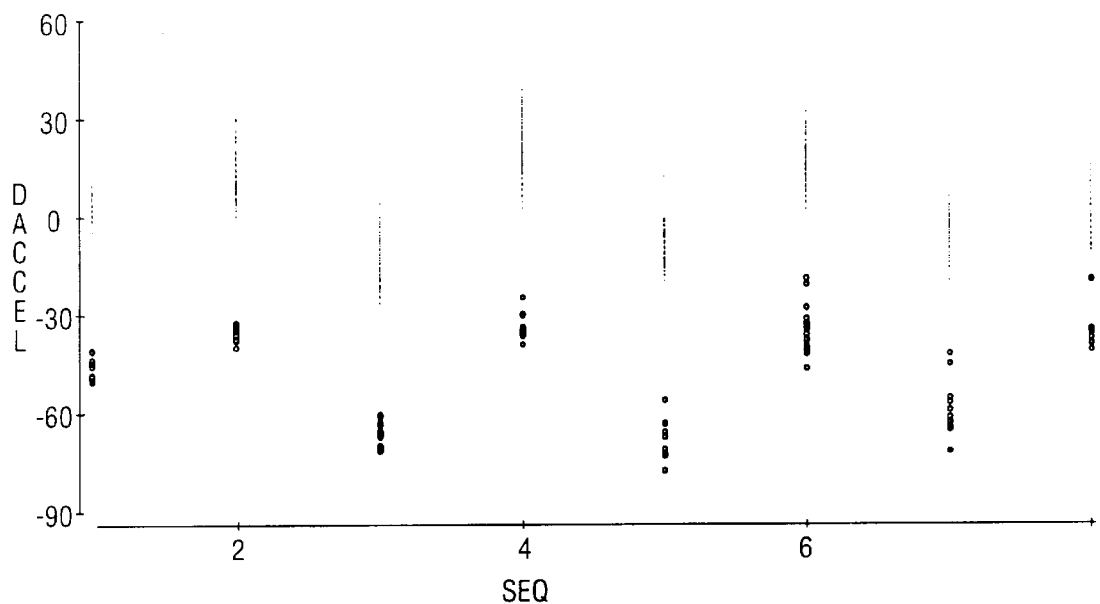
FIGS. 1 and 2 plot the deviant acceleration values versus cylinder number for many engine cycles under nearly steady-state conditions with induced misfires.
Figure 2:
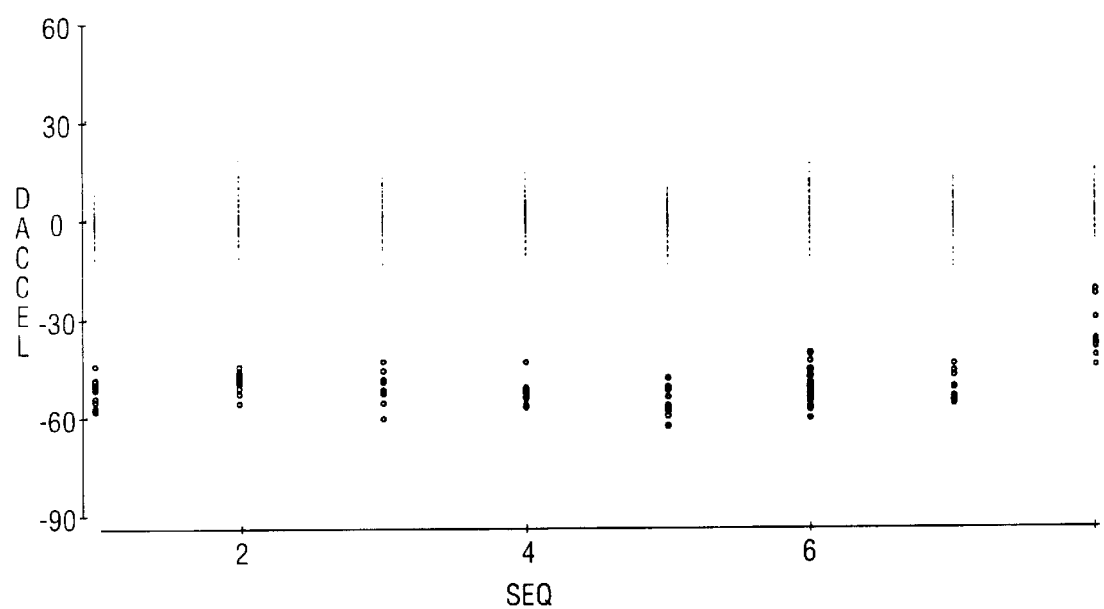

In accordance with the present invention, a static neural network is trained to produce the cylinder-specific ACCEL correction values according to the speed/load operating point of the engine. While the output of a static neural network does-vary as the engine speed or load varies, the output depends only on the current speed/load point, not the temporal order of their presentation to the network (as would be the case for a recurrent neural network). Thus, the network represents a function of two variables analogous to a two-dimensional lookup table. Actually, the network represents a set of N tables, N being the number of cylinders, since the output of the network is an N-dimensional vector describing cylinder-specific correction values.

Once trained, a network can produce the torsional correction values for any speed/load point within the range covered in the training data. Although this trained network could be deployed directly in the engine controller as a background calculation, preferably the trained network is used to generate a set of tables for on-board inclusion. The latter task is accomplished by generating a set of input vectors for each of the speed/load points desired in the table, and recording the network output vector at each point, thus giving the values to be stored in all N tables at each point.

While the final result is a set of traditional tables, there are advantages to training the network representation of the function rather than generating the tables in the conventional manner. For example:

1) Contrary to the traditional approach, the data for training the network is not gathered at a discrete set of steady-state conditions. Rather, the training data is gathered by traversing all speed/load operating points of the engine in a continuously variable manner. Since a static map is being generated, it is recommended that the engine conditions be varied somewhat gradually, throughout the test(s), but even this condition may be violated with little cause for concern. The engine data should fully cover the speed/load range of the engine (or the range over which torsional correction and misfire detection are to be applied), including many intermediate points. The data may be entirely gathered on the road, without the need for careful dynamometer control used in traditional calibration.

2) After the network is trained and tested to verify adequate representation of the torsional correction factors, tables may be generated at any desired point spacing. If interpolation from the tabulated values subsequently indicates a need for denser tables (smaller $\Delta$RPM or $\Delta$LOAD), they may be generated from the same network without returning to gather new empirical data. This is potentially a significant advantage, for it allows different table densities to be tested with little effort.

The procedure for generating torsional correction factors in accordance with the present invention is best illustrated with a specific example using data obtained from a four-cylinder engine having limited misfire detection capability at high speed because of the effects of torsional flexing of the crankshaft.

Figure 3:
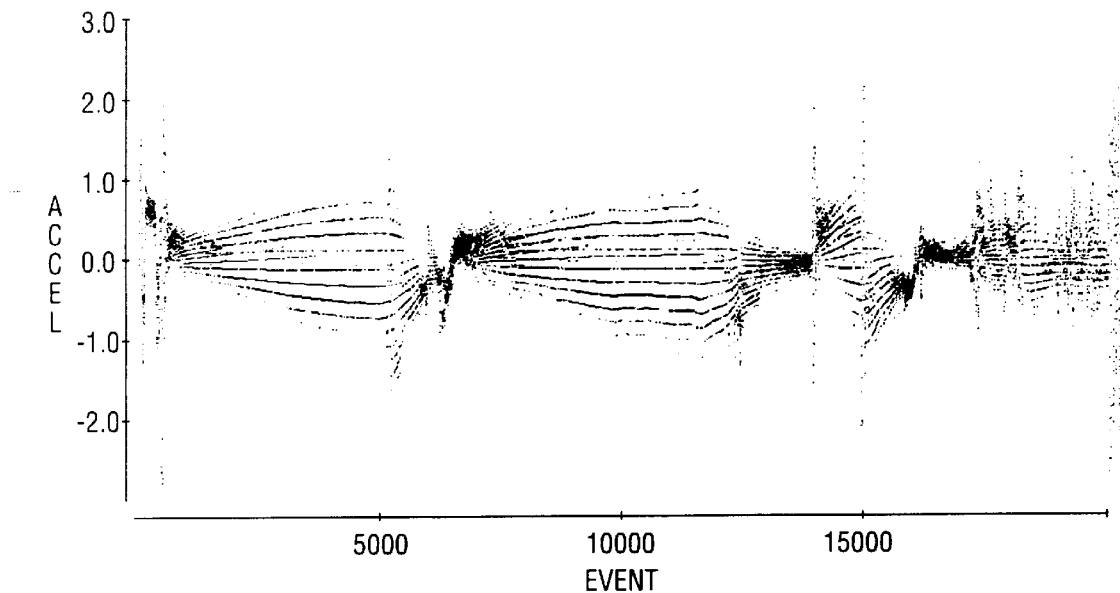
FIG. 3 shows the acceleration values for a normal (non-misfiring) engine operated over varied conditions.
Figure 4:
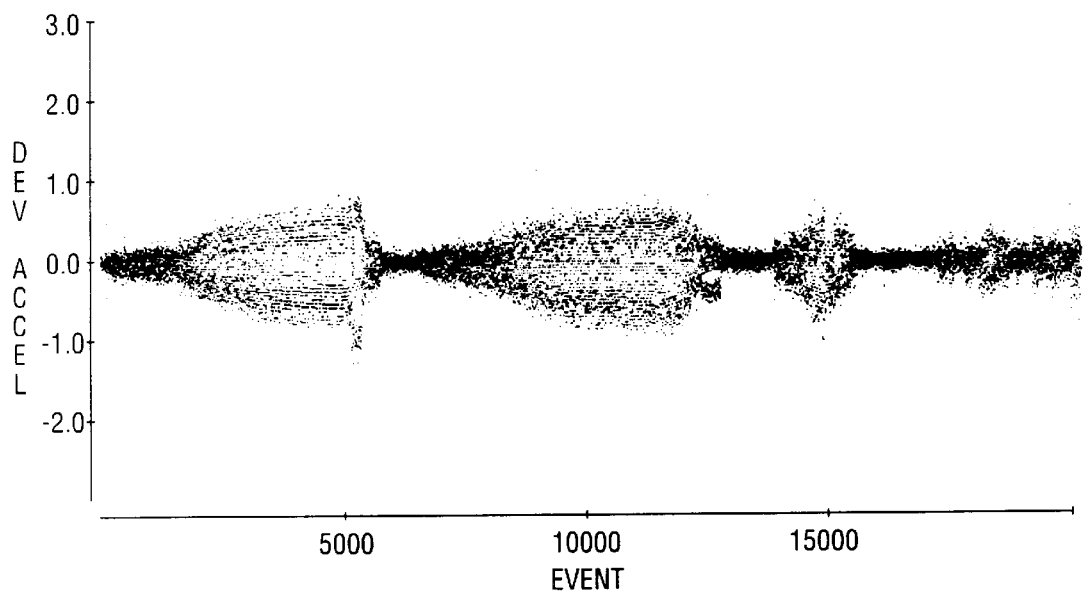
FIG. 4 shows the deviant acceleration values calculated from the data by subtracting the running mean from the data of FIG. 3.
Figure 5:
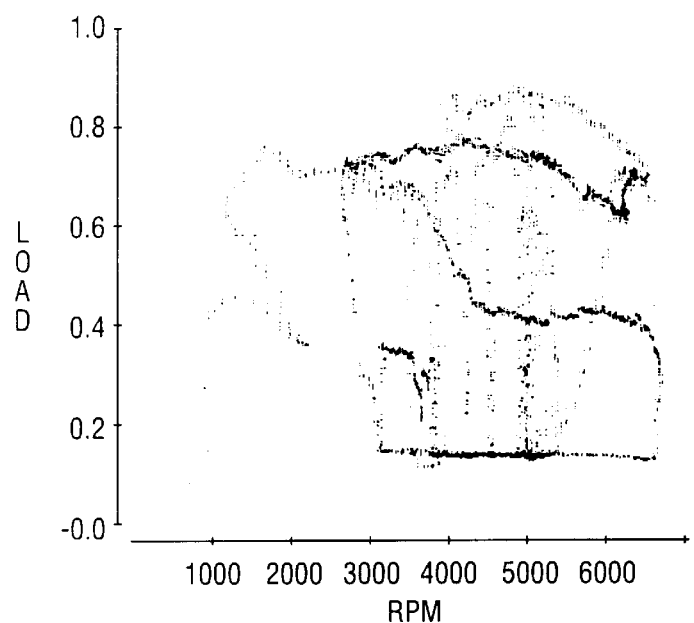
FIG. 5 is a map of speed/load trajectory for data shown in FIGS. 3 and 4.

FIG. 3 shows the ACCEL signal calculated from PIP-interval times collected from a vehicle with manual transmission using standard data collection equipment well known in the art. ACCEL signals measured over a wide range of engine conditions show considerable spread during high speed operation. This variability contains both random and systematic (i.e. cylinder-specific) components. FIG. 5 shows a map of the speed/load trajectory for the data of FIGS. 3 and 4.

This file contains no induced misfires; it is one of several such files used to train the network to characterize torsional effects under normal operation. The target signal, DEV_ACCEL, during training is a modified form of ACCEL, obtained by subtracting a running mean (AVE_ACCEL) as indicated by the following equation.

$$DEV\_ACCEL = ACCEL - AVE\_ACCEL \quad (1)$$

Although either ACCEL or DACCEL may be used in place of DEV_ACCEL, somewhat better performance is obtained with the latter as network target. FIG. 4 shows the DEV_ACCEL signal as computed for the same file shown in FIG. 3. Both ACCEL and DEV_ACCEL are quite similar; the latter has a zero baseline throughout the file as expected.

Each cycle of data (four firings) in the training files, an input vector is formed with the cycle-averaged (mean) RPM and LOAD as inputs to the network, and a target vector is created with the DEV_ACCEL for the four cylinders in firing order.

Figure 6:
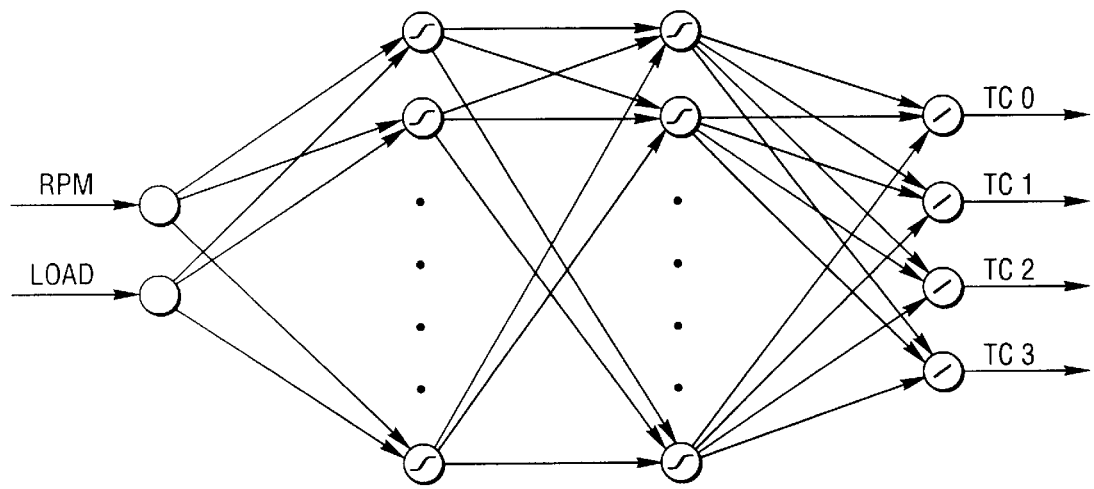
FIG. 6 shows a static network used in the present invention.

During training, the network, shown in FIG. 6, is presented with the input/output vectors for cycles chosen in random order from the data set. The internal weights of the network are adjusted gradually during training so as to minimize the error between network output and target vectors, using any of several common training algorithms. See for example, Puskorius, G. V. and L. A. Feldkamp (1994) Neurocontrol of Nonlinear Dynamical Systems with Kalman Filter-Trained Recurrent Networks. IEEE Transactions on Neural Networks Vol. 5, pp. 279–297.

Thus, over a data set covering all operating conditions of a normal engine, the neural network is trained to output the mean value of deviant acceleration of each of the cylinders individually for each speed and load. The network tends toward this result during training because each deviant acceleration value is used as the target toward which the learning process drives the network output for that particular cylinder at a given speed/load point. Of course, the noise or "spread" in a cylinder's acceleration values for points representing the same operating condition causes slight contradictions in the network as it trains. Nevertheless, the network responds as best it can by tending to output the average (approximately) of these slightly contradictory targets, as intended.

The trained neural network itself may be used to correct data for normal torsional effects to verify the value of this approach. This is accomplished by inputting the engine speed and load of each point in the test file to the network, and utilizing the correction factor from the component of the network output vector associated with the current cylinder number. Having verified that the network itself performs torsional correction adequately, one can then proceed to translate the torsional correction function from a neural network description into a set of correction tables. For the example given here, tables are generated using a grid of equally spaced points ($\Delta RPM=500$ $\Delta LOAD=0.1$), but other grid spacings may be used, including unequal ones.

FIGS. 7a–7d show plots of four torsional correction tables TC0–TC3, one per cylinder, as functions of speed and load using the aforementioned grid spacing. They each show clearly that at low speeds and loads, the torsional correction is virtually zero, as expected. In fact, based on a realization that torsional correction is primarily an issue with high-speed data, the table could easily be thrifted by eliminating low-speed areas, or at least making the grid coarser in areas of little change in correction factors. As mentioned earlier, this is trivially accomplished by querying the same neural network using input points based on a different grid.

There are several parameters affecting network architecture and training which must be chosen a priori. The network for the current example employed two input nodes (speed and load), 2 hidden layers consisting of 10 and 20 nodes, respectively, and four output nodes producing torsional correction values. A sigmoid transfer function was used in all but the output layer, which contains a linear transfer function instead.

Figure 8:
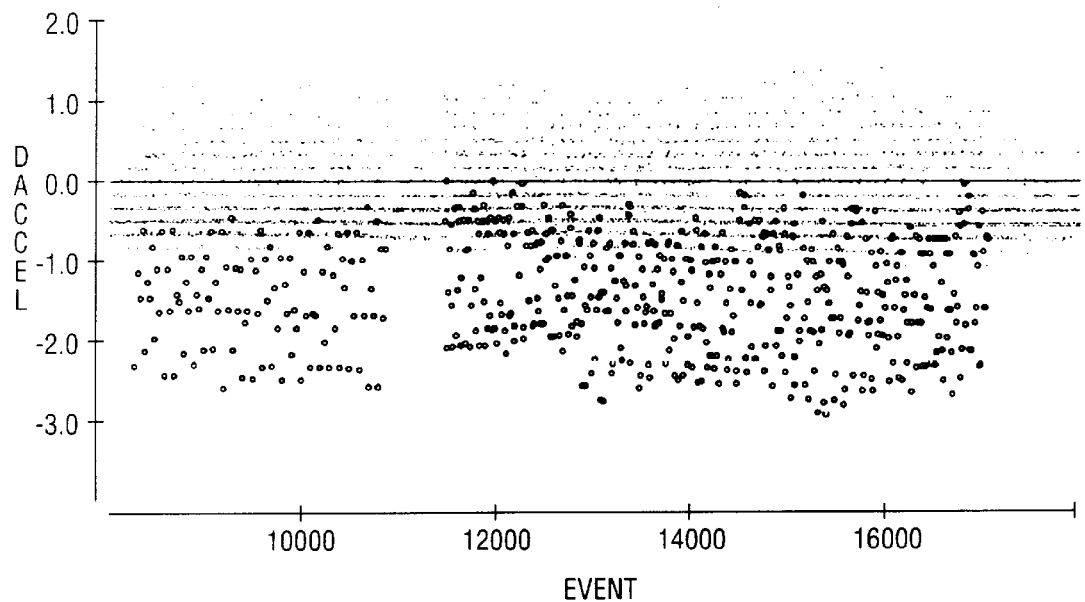
FIGS. 8 and 9 demonstrate the effectiveness of the torsional correction tables.
Figure 9:
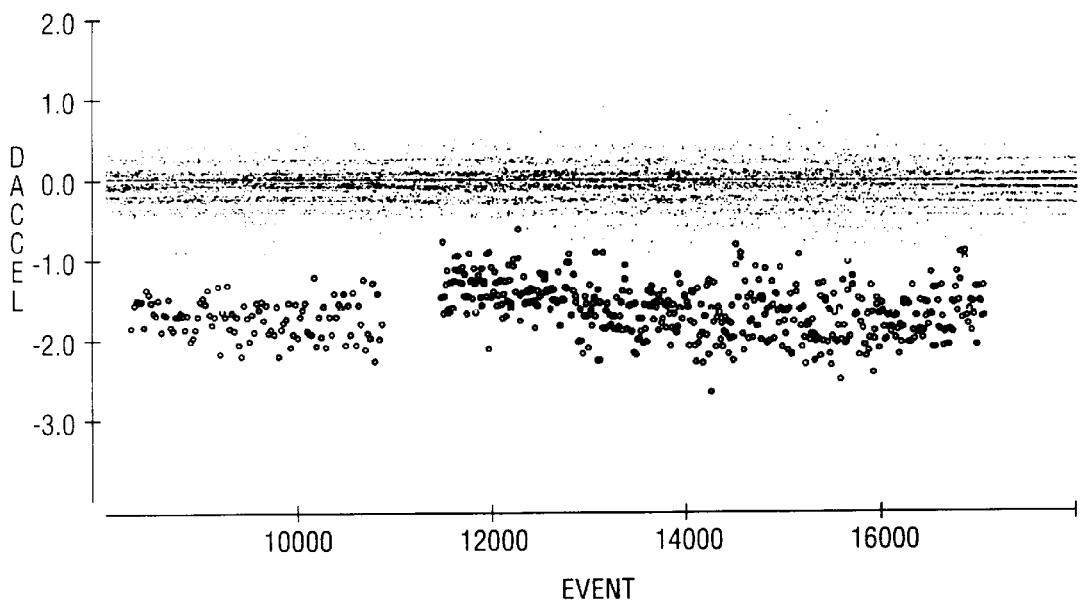

FIGS. 8 and 9 demonstrate the effectiveness of these torsional correction tables. FIG. 8 shows the ACCEL signal of a test car with misfire induced (denoted by circles). The uncorrected torsional effects cause the misfire signal to be blurred with that of the normal events. FIG. 9 shows the same data after applying the torsional correction from these table. The separation between misfiring and normal events is greatly enhanced, thus facilitating accurate misfire detection.

Feedforward neural networks are a particularly versatile means of capturing complex functional relationships from empirical data. Even when the desired end result is a traditional lookup table, a network greatly facilitates its generation by removing the restriction that the engine be operated over a predetermined set of steady-state points. By first training a neural network, the calibration of tables is automated for any table size or grid spacing.

This method of automated calibration via neural networks could be extended to many other functions in existing strategies.

While the best mode for carrying out the present invention has been described in detail, those familiar with the art to which this invention relates will recognize various alternative designs and embodiments for practicing the invention as defined by the following claims.

What is claimed is:

1. A method of automating the calibration of a parameter affecting the operation of a vehicle engine, comprising the steps of:
   training a neural network to model engine behavior, using a data set obtained from operating a representative engine over its full operating range;
   exercising the network to generate the calibration parameter by inputting values of engine operating condition variables; and
   storing the parameter in a memory device.

2. The method defined in claim 1 wherein two of said engine operating condition variables are engine speed and engine load.

3. The method defined in claim 1 wherein said parameter is one of a plurality of parameters.

4. The method defined in claim 3 wherein each of said plurality of parameters are associated with one of the cylinders of the engine.

5. The method defined in claim 4 wherein the parameter is an acceleration correction value that is used to compensate for the variation in crankshaft acceleration attributable to flexing of the crankshaft of an engine.

6. The method defined in claim 5 wherein said engine operating condition variables are engine speed and engine load.

7. The method defined in claim 6 wherein said parameter is used in a vehicle on-board diagnostic system.

8. The method defined in claim 1 wherein the network is a feedforward network.

9. The method defined in claim 1 wherein said training step is performed off vehicle using a data set previously gathered on the road under steadystate and transient conditions.

10. A method of automating the calibration of lookup tables containing correction values to be used in an on-board vehicle system, comprising the steps of:

training a neural network, off-board said vehicle, using a data set obtained from operating a representative engine under normal operating conditions, to model engine behavior by outputting cylinder specific crankshaft acceleration correction values in response to any engine speed and load input conditions;

exercising the network to generate the correction values by inputting values of engine speed and load; and storing the correction values in a memory device.

11. The method defined in claim 10 wherein said system is an engine misfire detection system.

12. The method defined in claim 11 wherein the correction data is used to compensate for the variation in crankshaft acceleration attributable to flexing of the crankshaft of an engine.

13. The method defined in claim 12 wherein the network comprises an input layer having two input nodes for receiving engine speed and load values respectively, a plurality of hidden layers and an output layer comprising a plurality of output nodes for producing the correction values for individual engine cylinders.

14. The method defined in claim 12 wherein a non-linear transfer function is used in the hidden layers and a linear transfer function is used in the output layer.

15. The method defined in claim 14 wherein the plurality of hidden layers includes at least two layers each implementing a sigmoid transfer function.

16. The method defined in claim 15 wherein the first of said two hidden layers comprises ten nodes and the second of said two hidden layers comprises twenty nodes.

* * * * *